US008491025B2

(12) United States Patent
Pollock et al.

(10) Patent No.: US 8,491,025 B2
(45) Date of Patent: *Jul. 23, 2013

(54) MAGNET CONTROLLER FOR CONTROLLING A LIFTING MAGNET

(75) Inventors: Michael Pollock, Troy, MI (US); Fred Kahl, Grosse Ile, MI (US)

(73) Assignee: Edw. C. Levy Co., Detroit, MI (US)

( * ) Notice: Subject to any disclaimer, the term of this patent is extended or adjusted under 35 U.S.C. 154(b) by 1343 days.

This patent is subject to a terminal disclaimer.

(21) Appl. No.: 12/026,125

(22) Filed: Feb. 5, 2008

(65) Prior Publication Data

US 2008/0191504 A1 Aug. 14, 2008

Related U.S. Application Data

(60) Provisional application No. 60/889,664, filed on Feb. 13, 2007.

(51) Int. Cl.
*B66C 1/06* (2006.01)
*H02P 9/10* (2006.01)

(52) U.S. Cl.
USPC ........................... 294/65.5; 361/144; 414/606

(58) Field of Classification Search
USPC .......... 294/65.5, 907; 318/141, 145; 361/139, 361/143, 144, 145; 269/3, 139; 414/606
See application file for complete search history.

(56) References Cited

U.S. PATENT DOCUMENTS

| | | | | |
|---|---|---|---|---|
| 2,239,750 | A * | 4/1941 | Weeks et al. | 212/197 |
| 2,623,774 | A * | 12/1952 | Hubbard | 294/65.5 |
| 3,445,105 | A * | 5/1969 | Marcher | 269/17 |
| 5,817,712 | A * | 10/1998 | Weinberger et al. | 524/513 |
| 5,905,624 | A | 5/1999 | Andreica et al. | |
| 5,977,730 | A * | 11/1999 | Clutter et al. | 318/141 |
| 6,082,210 | A * | 7/2000 | Ise | 74/424.83 |
| 7,697,253 | B1 * | 4/2010 | Maraval | 361/144 |
| 7,848,861 | B2 * | 12/2010 | Pollock et al. | 701/29 |
| 7,992,850 | B2 * | 8/2011 | Zhang et al. | 269/3 |
| 8,059,381 | B2 * | 11/2011 | Maraval | 361/144 |
| 2005/0094345 | A1 * | 5/2005 | Pollock et al. | 361/120 |

FOREIGN PATENT DOCUMENTS

| | | |
|---|---|---|
| DE | 2610781 | 9/1977 |
| DE | 19617105 | 10/1997 |
| JP | 10157965 | 6/1998 |
| KR | 100368271 | 1/2003 |

OTHER PUBLICATIONS

Examination Report from European Patent Office for application No. 08 250 506.6-1256 dated Jun. 4, 2012.

* cited by examiner

*Primary Examiner* — Paul T Chin
(74) *Attorney, Agent, or Firm* — Honigman Miller Schwartz and Cohn LLP

(57) ABSTRACT

A method for operating an electric crane, comprises the steps of activating a magnet controller to cause a current to flow through a magnet for creating a magnetic field about the magnet for securing a load to the magnet, receiving a feedback input value at a logic controller from a device associated with the electric crane, in response to the received feedback input value at the logic controller, receiving a command value at the magnet controller from the logic controller, and in response to the received command value at the magnet controller, modifying the current flow from the magnet controller to the magnet to change the magnetic field about the magnet. A system is also disclosed.

12 Claims, 7 Drawing Sheets

MAGNET CONTROLLER FOR CONTROLLING A LIFTING MAGNET

CROSS REFERENCE TO RELATED APPLICATION

This application claims the benefit of U.S. Provisional Patent Application No. 60/889,664 filed on Feb. 13, 2007.

TECHNICAL FIELD

The invention relates in general to material handling machines and more particularly relates to the control of electro-magnets manipulated by cranes.

BACKGROUND

Electro-magnetic lifting magnets are commonly associated with cranes. Cranes with lifting magnets are utilized for manipulating relatively heavy magnetic materials, such as, for example, scrap steel, ferrous material, and the like.

In operation, if electric current is delivered, without interruption, to the lifting magnet, the lifting magnet generates heat which detracts from its magnetic strength. To compensate for this loss of magnetic strength, the operator often increases current flow to the magnet. The increased current flow may solve the immediate problem by re-establishing the magnet's strength; however, it exacerbates the heating of the magnet due to $I^2R$ losses generated in the windings of the lifting magnet. If this current escalation is carried out to an extreme, it can lead to destruction/failure of the lifting magnet.

An experienced crane operator may, however, manipulate the electromagnet controls in other ways in an effort to manually establish an efficient operation of a crane/lifting magnet combination. For example, an efficient operation of a crane can be manually controlled by the operator by manipulating the timing of an energize-to-de-energized duty cycle period (i.e., a rest period) of a lifting magnet during each load-unload-reload cycle (hereinafter lift cycle). The "load" portion of the lift cycle may be, for example, thirty seconds long and the "unload" period (i.e. the period between unloading and reloading) may be, for example, three seconds long. As such, an operator may be able to regain a certain efficiency by manually reducing the current to the magnet during the unload period. Of course, the relationship between duty cycle and loss of efficiency is generally not linear.

If a crane operator falls behind schedule, the crane operator may not appropriately time or otherwise provide the lifting magnet with a rest period, thereby causing the lifting magnet to overheat due to a constant, high current that passes through the lifting magnet when it is energized. If the electro-magnet is utilized for a long period of time during a daily shift (without appropriately apportioning the rest period in each lift cycle), an over-heating condition may result in a temporary failure of the lifting magnet. Even further, if this operation is practiced in a similar manner over a protracted period, the repetitive over-heating condition may result in permanent damage to the lifting magnet.

In addition, several drawbacks including, for example, voltage spiking of a hoist motor and whipping of the crane derrick may occur should a crane operator improperly de-energize a lifting magnet during a condition when a crane's hoist motor is generating high torque during a lifting operation.

Accordingly, there is a need in the art for a method and apparatus for improving the control of a crane magnet.

BRIEF DESCRIPTION OF THE DRAWINGS

The disclosure will now be described, by way of example, with reference to the accompanying drawings, in which.

DETAILED DESCRIPTION

Figure 1A:
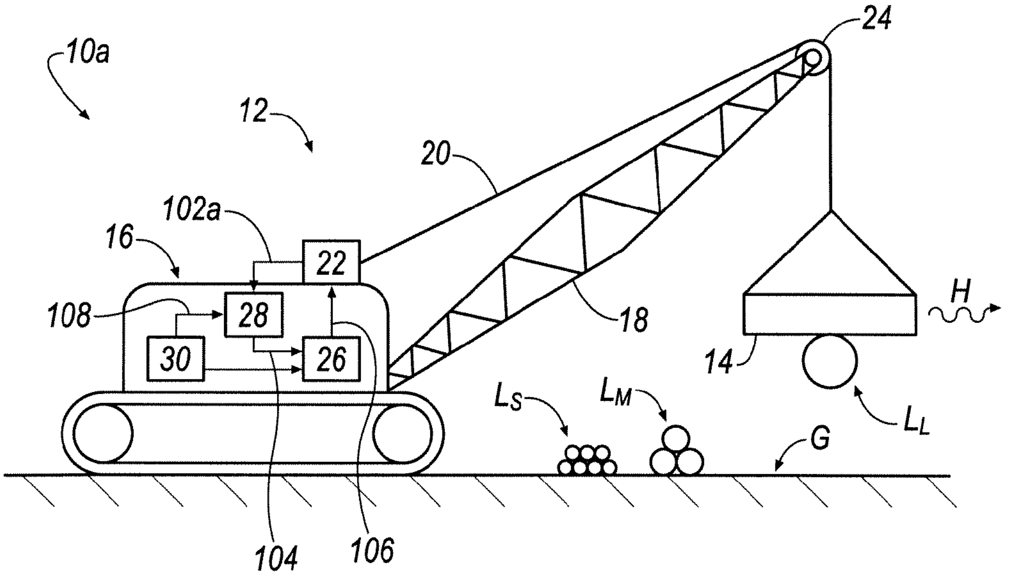
FIGS. 1A-1D each illustrated an environmental view of a lifting magnet and a crane in accordance with an exemplary embodiment of the invention.

The Figures illustrate an exemplary embodiment of a method and apparatus for controlling a lifting magnet of a crane in accordance with an embodiment of the invention. Based on the foregoing, it is to be generally understood that the nomenclature used herein is simply for convenience and the terms used to describe the invention should be given the broadest meaning by one of ordinary skill in the art.

Referring to FIGS. 1A-1D, a system for moving magnetic material is shown generally at 10*a*-10*d*, respectively, according to an embodiment. The system 10*a*-10*d* is generally defined by a crane 12 and an electro-magnet referred to herein as a lifting magnet 14. The crane 12 is generally defined to include an operator cabin 16 and a derrick 18. The crane 12 also includes a lift cable 20 that is reeled from a hoist assembly including a hoist motor 22.

The lift cable 20 is supported by a pulley 24 and serves as a bearing surface for spatially supporting the lifting magnet 14 above ground, G, by way of the lift cable 20. According to an embodiment, the lift cable 20 may provide a dual function in that the lift cable 20 structurally supports the load of the magnet 14 while also serving as a support structure for supporting an electric conductor (not shown) used to deliver electrical current to lift magnet 14 from magnet controller 26.

According to an embodiment, although not required, the magnet controller 26 is shown generally disposed within the operator cabin 16. According to an embodiment, the magnet controller 26 may provide a flow of current to the lifting magnet 14 in order to create a magnetic field about the magnet 14 for lifting magnetic material, such as, for example, a small load, $L_S$, a medium-sized load, $L_M$, or a larger load, $L_L$.

According to an embodiment, although not required, a controller 28, such as, for example, a programmable logic controller (PLC) is shown generally disposed within the operator cabin 16. As illustrated, the PLC 28 may receive information from operator inputs 30, which may include, for example, joy sticks, levers, dials, switches, or the like. In addition, the operator inputs 30 may be provided directly to the hoist motor 22 by way of the magnet controller 26. In an embodiment, the operator inputs 30 may include levers, dials, and/or switches for initiating the energizing and de-energizing of the magnet 14 that, respectively, activates or deactivates a magnetic field about the magnet 14 for respectively retaining, moving, and releasing the load $L_S$, $L_M$, $L_L$ therefrom.

The inclusion of the PLC 28 in the system 10 provides for an efficient operation of the crane 12. Although operational information may be provided to the PLC 28 from the hoist motor 22 and/or operator inputs 30, the PLC 28 may also receive operational information from a device 32*a*-32*c*. The device 32*a* (FIG. 1B) may include, for example, a load cell. The device 32*b* (FIG. 1C) may include, for example, an imaging camera. The device 32*c* (FIG. 1D) may include, for example, a magnet temperature sensor. Accordingly, with the inclusion of a device 32*a*-32*c*, the PLC 28 may provide a closed-loop feedback system that effects control over numerous output devices including, for example, the magnet controller 26.

Operation Mode 1—Power Adjust Mode

According to an embodiment, the PLC 28 may receive information from one of more of the hoist motor 22, load cell 32*a*, camera 32*b*, and/or temperature sensor 32*c* to provide a signal to the magnet controller 26 that references an amount of current, I1-I3 (FIG. 3), provided to the lifting magnet 14. In addition, the information received at the PLC 28 from the hoist motor 22 and/or devices 32*a*-32*c* may also be supplemented with or effected by information from operator inputs 30. The information provided to the PLC 28 may be conducted in any desirable fashion, such as, for example, a hardwired communication (see, e.g., feedback 102*a* from hoist motor 22/signal 108 from operator inputs 30), or, alternatively, wireless communication (see, e.g., feedback 102*b* from devices 32*a*-32*c*). Although the signal from devices 32*a*-32*c* is illustrated to be wireless, it will be appreciated that the feedback from devices 32*a*-32*c* may be hardwired as well.

Figure 1B:
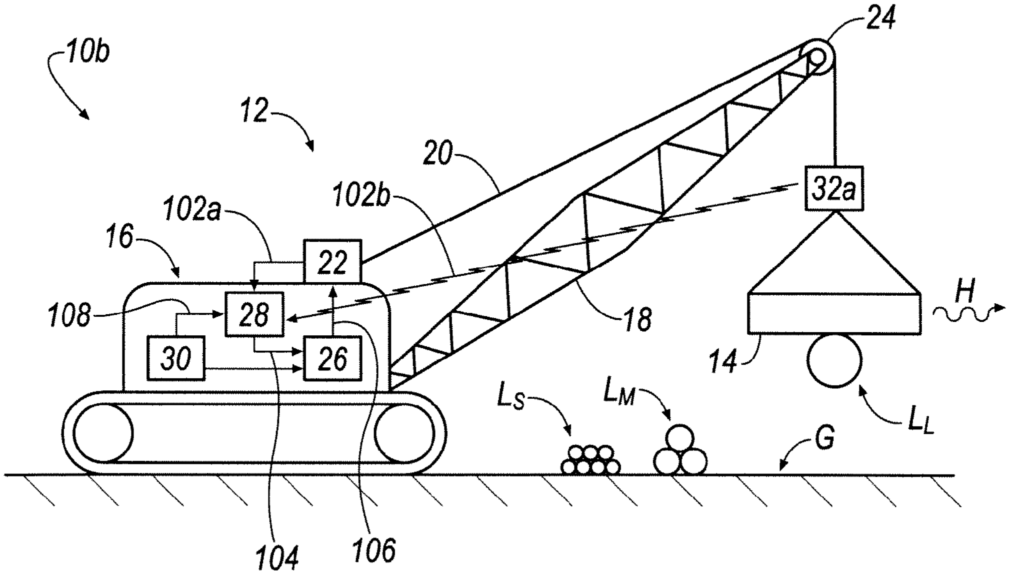
Figure 1C:
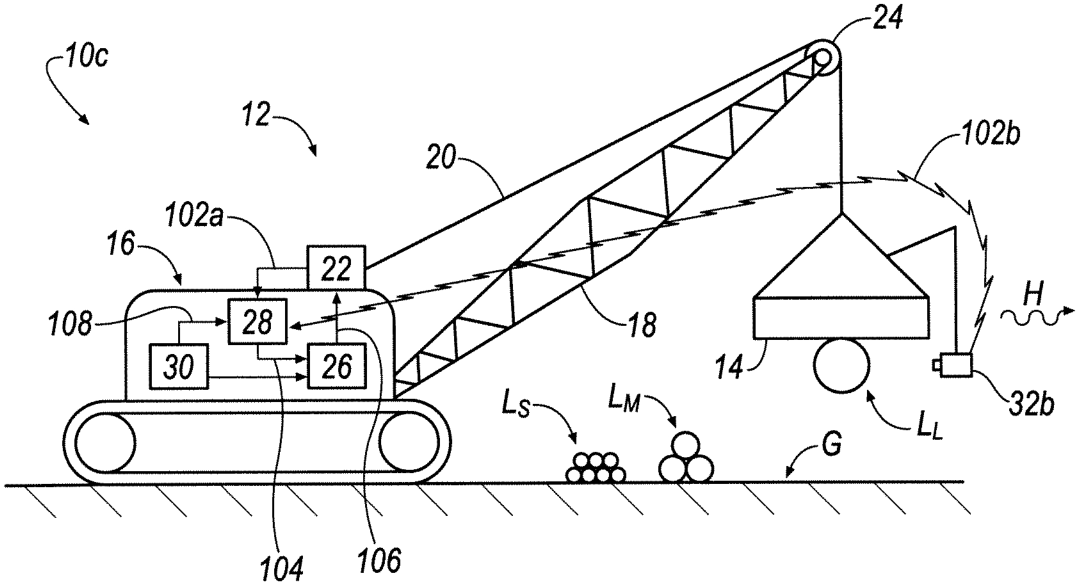
Figure 1D:
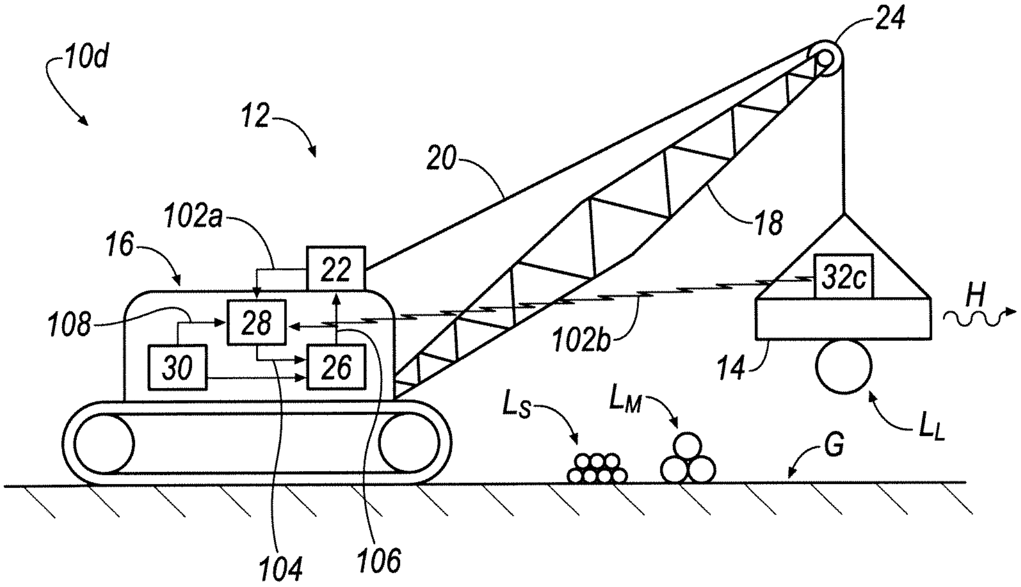
Figure 2:
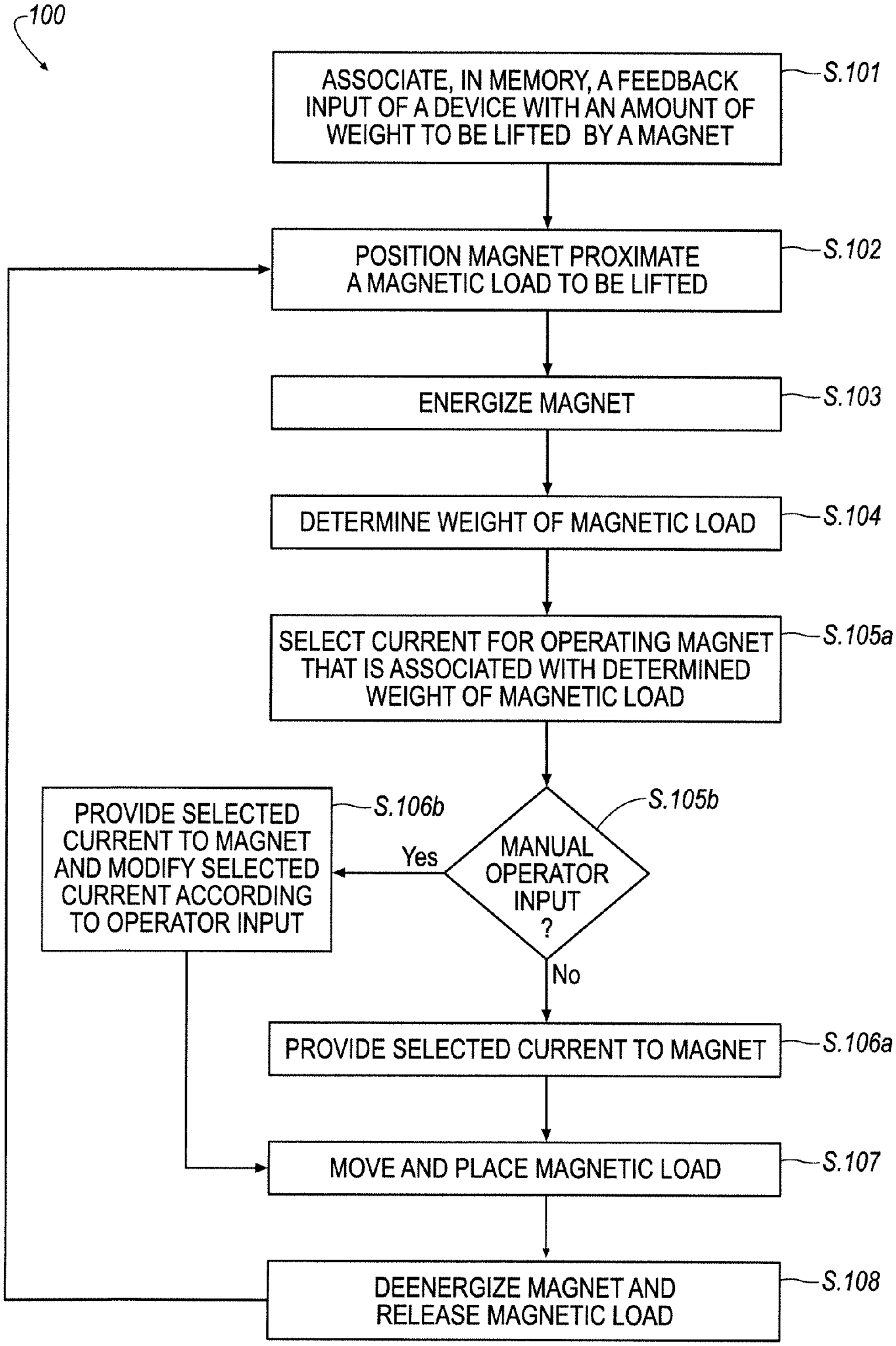
FIG. 2 is a flow chart illustrating a method for providing efficient operation of the electric crane in accordance with an exemplary embodiment of the invention.

As seen in FIG. 2, a method 100 including steps S.101-S.108 for providing efficient operation of the lift magnet 14 is shown according to an embodiment. In general, the method 100 operates on the principle of providing an input 102*a*, 102*b*, 108 (FIGS. 1A-1D) to the PLC 28, which may be provided, for example, from the hoist motor 22, operator inputs 30, or devices 32*a*-32*c*. In correlation with the input 102*a*, 102*b*, 108, efficient operation of the lift magnet 14 is enabled by providing a command 104 (FIGS. 1A-1D) to the magnet controller 26 from the PLC 28 that results in a controlled, output 106 (FIGS. 1A-1D) of current from the magnet controller 26 to the lifting magnet 14.

Prior to operating the system 10*a*-10*d* according to the method 100, the PLC 28 may be pre-programmed at step S.101 to associate the input 102*a*, 102*b*, 108 of 22, 30, 32*a*-32*c* with an amount of weight that is to be lifted by the magnet 14. In the following description, according to an embodiment, the amount of weight is defined to include either the weight of the small load, $L_S$, which is less than the weight of the medium load, $L_M$, which is less than the weight of a large load, $L_L$. Additionally, according to an embodiment, it may be assumed that the type and density of material defining the load identified at $L_S$, $L_M$, and $L_L$ may be similar; the only difference, for example, between the three loads identified at $L_S$, $L_M$, and $L_L$ may be the relative mass of each load $L_S$, $L_M$, and $L_L$.

According to an embodiment, at step, S.101, the PLC 28 may be pre-programmed with, for example, a data map or a look-up table by associating the input 102*a*, 102*b*, 108 in relation to a weight range defined by each load $L_S$, $L_M$, $L_L$. Referring first to FIG. 1A, for example, the data map or look-up table may be constructed by associating a weight range of the load (i.e. $L_S$, $L_M$, $L_L$) with a respective input 102*a* to be provided by the hoist motor 22. In an embodiment, the input 102*a* provided by the hoist motor 22 may be an amperage utilized by the hoist motor 22. As such, if the amperage 102*a* utilized by the hoist motor 22 is relatively low, the PLC 28, by referring to the data map or lookup table, may be able to determine that the load is relatively light (i.e., a small load, $L_S$), and therefore, the PLC 28 may instruct the magnet controller 26 to reduce the current 106 provided to the magnet 14.

Referring to FIG. 1B, for example, the data map or look-up table may be constructed by associating a weight of the load (i.e. $L_S$, $L_M$, $L_L$) with a respective input 102*b* to be provided by the load cell 32*a*. In an embodiment, the input 102*b* provided by the load cell 32*a* may be a gauge factor. As such, if the gauge factor 102*b* is relatively low, the PLC 28, by referring to the data map or lookup table, may be able to determine that the load is relatively light (i.e., a small load, $L_S$), and therefore, the PLC 28 may instruct the magnet controller 26 to reduce the current 106 provided to the magnet 14.

Referring to FIG. 1C, for example, the data map or look-up table may be constructed by associating a weight of the load (i.e. $L_S$, $L_M$, $L_L$) with a respective visual attribute 102*b* to be provided by the camera 32*b*. In an embodiment, the input 102*b* provided by the camera 32*b* may be a captured image of the load $L_S$, $L_M$, $L_L$. As such, once the captured image 102*b* is scrutinized by, for example, the PLC 28, the PLC 28 may determine that the image of the load evidence that it is comprised of a class of materials that are relatively easy to pick up (perhaps because of the geometry or topography of the materials, or some other correlating visual feature), and therefore, the PLC 28 may instruct the magnet controller 26 to reduce the current 106 provided to the magnet 14.

Referring first to FIG. 1D, for example, the data map or look-up table may be constructed by associating a weight of the load (i.e. $L_S$, $L_M$, $L_L$) with a respective input 102*b* to be provided by the magnet temperature sensor 32*c*. As such, if the temperature of the magnet 14 is relatively high, and the load is relatively light, and therefore, the PLC 28 may instruct the magnet controller 26 to incrementally reduce the current 106 provided to the magnet 14 to a threshold that permits retention of the load to the magnet while also reducing the temperature of the magnet 14.

Although a data map or look-up table may be programmed to function in a closed-loop feedback system described above, it will be appreciated that the invention is not limited as such. If desired, inputs 108 from the operator controls 30 may be provided to the PLC 28 (see, e.g., step, S.106*b*, below). For example, the input 108 provided by way of the operator controls 30 may include, for example, a signal from a rheostat that reduces the current flow to the magnet 14. Thus, the automatic, closed-loop nature of the invention, as described in relation to the inputs 102*a*, 102*b*, may also be supplemented with manual inputs 108 originating from the crane operator positioned within the operator cabin 16. In addition, it will be appreciated that other feedback parameters may be provided by any device that is/are directly or indirectly useful in determining the minimum current needed by the lift magnet 14 to pick up the weight of the load $L_S$, $L_M$, $L_L$.

Referring now to step S.102, the crane 12 may be operated by spatially positioning the magnet 14 proximate a load $L_S$, $L_M$, $L_L$ that is to be lifted. Then, at step S.103, the magnet 14 is energized and the load $L_S$, $L_M$, $L_L$ is drawn and secured to the magnet 14 by way of a magnetic field.

At step S.104, the hoist motor 22 or device 32*a*-32*c* is activated to determine the weight of the load $L_S$, $L_M$, $L_L$ according to the pre-programmed mapped data of step S.101. If, for example, the hoist motor 22 is utilized at step S.104, the data map may be programmed at step, S.101, such that the data map may know that the hoist motor 22 may range in operation between a low end of 250 amperes, which is associated with an amperage needed to lift small class of material defined by load, $L_S$, and a high end of 600 amperes, which is associated with an amperage needed to lift a large class of material defined by load, $L_L$.

Then, at step S.105*a*, once the PLC 28 has been provided with a feedback input 102*a*, 102*b* that is associated with a weight of the load $L_S$, $L_M$, $L_L$, the PLC 28 selects a current from the data map for operating the magnet 14 and sends a the current command signal to the magnet controller 26, which is shown generally at 104 in FIGS. 1A-1D. In effect, the current command 104 provides an instruction to the magnet controller 26 that sets the magnitude of current 106 to be provided to the magnet 14 at step, S.106*a*. According to one aspect of the method 100, the current that is selected from the data map may be a minimum amount of current needed to create a magnetic field that will lift a corresponding weight of the class of material $L_S$, $L_M$, $L_L$. As such, a smaller/medium class of material, $L_S$, $L_M$, may result in the magnet 14 needing a lower current than that of a "per unit load"/larger class of material, $L_L$. Thus, when a smaller/medium class of material, $L_S$, $L_M$, is lifted by the magnet 14, the magnet 14 may be operated at a lower current level, thereby increasing the efficiency of the system 10 by operating the magnet 14 at a lower temperature. Classification of material can be directed to one or more physical features (except for weight). For example, topography, geometry, chemical make up, volume characteristics, etc.

As described above, if, for example, the operator provides a manual input 108, the PLC 28, at step, S.105*b* may monitor for such a condition. If no manual input 108 by the operator is provided, the method 100 is advanced to step 105*a*. However, if a manual input is provided at step, S.105*b*, the current command 104 is provided to the magnet controller 26 and is then altered according to the manual input 108 provided by the operator at step S.106*b*.

In operation, the current provided at either step S.106*a* or S.106*b* is associated with electrical power provided by the magnet controller 26. The current provided by the magnet controller 26 may be less than a maximum potential current provided by the magnet controller 26 in view of the different classification of material $L_S$, $L_M$, $L_L$ to be lifted by the magnet 14 according to the pre-programmed data map or look-up table of step S.101. Thus, because a limited current may be provided to operate the magnet 14, the magnet 14 may produce less heat, H (FIGS. 1A-1D), and therefore, is less susceptible to failure or damage. In addition, because there is a smaller amount of heat, H, produced by the magnet 14, the system 10 may operate with a reduced rest period in a lift cycle, thereby increasing efficiency of the system 10.

Figure 3:
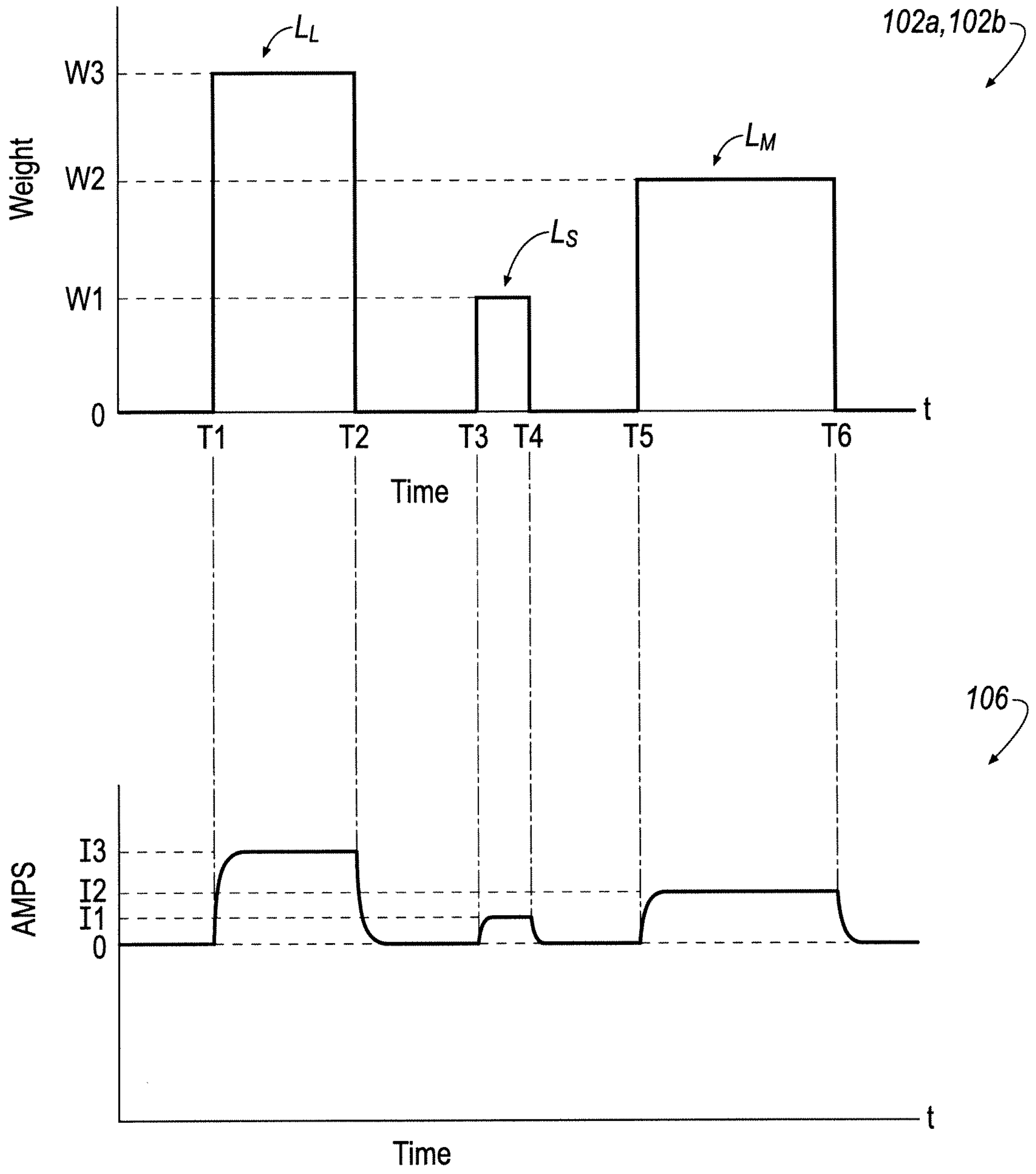
FIG. 3 is a timing diagram associated with the method of FIG. 2 in accordance with an exemplary embodiment of the invention.

Referring to FIG. 3, an exemplary embodiment of the operation of the system 10 is shown. If, for example, the hoist motor 22 is activated at time, T1 (i.e. steps, S.103, S.104), and, for example, operates with a high end current of 600 or more amperes, the PLC 28, according to the data map, may determine that the weight of the load is that of a large load, $L_L$; as such, the PLC 28 may provide an instruction 104 to the magnet controller 26 at step S.105 to limit a current, I3 (i.e., the signal 106), provided to the magnet 14 at step S.106*a*. Thus, for a large load, $L_L$, the current, I3, flowing through the magnet 14 may be, for example, approximately 77 amperes, which is adequate to create a magnetic field that retains the large load $L_L$ to the magnet 14.

At step, S.107, the operator of the crane 12 may move and position the large load $L_L$ to a desired location. Then, at time, T2 (i.e., step S.108), the magnet 14 may be de-energized such that the large load, $L_L$, is released from the magnet 14 at step, S.108. Then, a rest period may occur from time, T2, until time, T3. Later, at time, T3, the method may be returned to steps S.102 and S.103 where the magnet 14 is positioned and energized so that the hoist motor 22 is activated again at step S.104.

At time, T3, the hoist motor 22 may operate with a low end current of approximately 250 amperes, which causes the PLC 28, according to the data map, to determine, at step S.104, that the weight of the magnetic load is that of a small load, $L_S$; as such, the PLC 28 may provide an instruction 104 to the magnet controller 26 at step S.105 to limit a current, I1, provided to the magnet 14. Thus, the current, I1, flowing through the magnet 14 may be, for example, approximately 50 amperes, which is adequate to provide a magnetic field that retains the small load, $L_S$, without unnecessarily overheating the magnet 14 by otherwise operating the magnet 14 with a current (e.g., I3) higher than 50 amperes.

The magnet 14 is then de-energized at time, T4, and a rest period occurs between time, T4, and time, T5. Then, from time, T5 to T6, a similar operation as that described above is provided for a medium load, $L_M$, which may result in a current, I2, flowing through the magnet 14 that is approximately equal to 65 amperes. Thus, the because the current, I2, flowing through the magnet 14 is approximately 65 amperes, the current, I2, is adequate to provide a magnetic field to retain the medium load, $L_M$, thereto without unnecessarily overheating the magnet 14 by otherwise operating the magnet 14 with a current higher (e.g., I3) than 65 amperes.

Accordingly, it will be appreciated that the limited supply of current (e.g., I1 or I2) to the magnet 14 provides a cooler magnet 14 due to less operational heat, H, that is related to conventional higher operating currents of conventional systems. Because conventional systems do not consider the weight of the load, conventional systems must operate a magnet 14 at a higher current in order to adequately cover the upper load.

Because the PLC 28 may recognize that the magnet 14 is lifting, for example, a lighter load (i.e., a smaller load, $L_S$), the power consumed from a current draw, I1, of 50 amperes may be only 8537 BTUs (i.e., $50^2 \times 3.4149$) whereas a heavier load (e.g., the larger load $L_L$) consuming a current draw, I3, of 77 amperes may be approximately equal to 20,246 BTUs (i.e., $77^2 \times 3.4149$). As such, the PLC 28 also may provide a cost savings for the host company of the crane operator with respect to a smaller amount of consumed electricity, which results from a more efficient operation of the crane 12.

Although the method 100 is based upon a data map or look-up table that considers a weight of the load, $L_S$, $L_M$, $L_L$, it will be appreciated that the invention is not limited to a data map or look-up table utilizing a weight characteristic of the load $L_S$, $L_M$, $L_L$ to determine a current provided to the magnet 14. For example, referring to FIG. 4, a method 200 is related, in general, to any visual characteristic of the load, $L_S$, $L_M$, $L_L$, or, alternatively, an operational characteristic of the system 10*a*-10*d* rather than a weight of the load, $L_S$, $L_M$, $L_L$.

Figure 4:
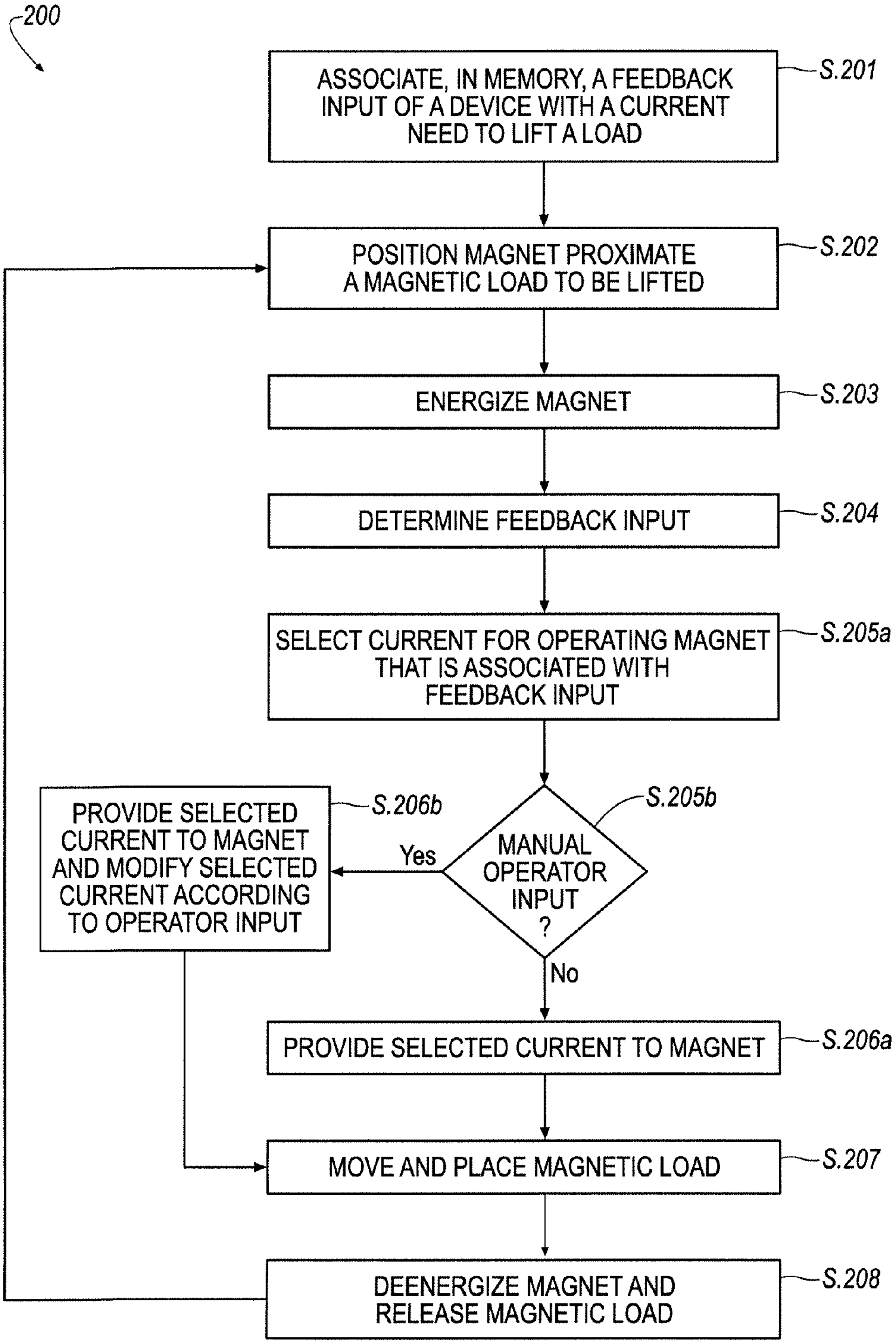
FIG. 4 is a flow chart illustrating a method for providing efficient operation of the electric crane in accordance with an exemplary embodiment of the invention.

Referring to FIG. 4, the method 200 may be related to, for example, a material class of the load, $L_S$, $L_M$, $L_L$, including, for example, a geometric size of the constant particles that make up the load, topography, or constituent elements having visual manifestations, of the load, $L_S$, $L_M$, $L_L$, determined by the camera 32*b* at step S.204. Upon learning the geometric size, material class, or material constituent of the load, $L_S$, $L_M$, $L_L$, the PLC 28 may send a control signal 104 at step S.206*a* to adjust the current 106 provided to the magnet 14.

Accordingly, if, for example, the camera 32*b* detects a large object (e.g., $L_L$ of classification "x", at step, S.204) the PLC 28 may automatically tell the magnet controller 26 at 104 to set a current 106 at step S.206*a* to a highest possible setting, whereas, alternatively, if, the camera 32*b* detects a large object (e.g., $L_L$, of classification "y" where "x" and "y" are classifications of the topography of the constituent pieces that make up load $L_L$ at step, S.204) the PLC 28 may automatically command the magnet controller 26 at 104 to set a current 106 at step S.206*a* to a lower setting.

If, for example, the current 106 is over- or under-compensated by the PLC 28 according to the input 102*b* provided by the camera 32*b*, an operator input 108 may be provided at step, S.206*b*, to provide the needed current compensation in order to arrive at the desired behavior of the magnet 14. The desired behavior of the magnet 14 may be, for example, a decrease in current to reduce the magnetic field about the magnet 14, or, alternatively, an increase in the magnetic field about the magnet 14. According to an embodiment, over time, the PLC 28 may include intelligence that permits the PLC 28 to be "trained" by monitoring the operator's actions in conjunction with characteristics of images captured by the camera 32*b* temperature of the magnet, and weight of load L compensate for current delivered to the magnet 14.

According to an embodiment, the method 200 may be related to an input factor or characteristic of the system 10 including, for example, a temperature of the magnet 14 determined by the temperature sensor 32*c* at step S.204. Upon learning the temperature of the magnet 14, the PLC 28 may send a control signal 104 at step S.206*a* to adjust the current 106 provided to the magnet 14.

Accordingly, if, for example, the temperature sensor 32*c* detects a high operating temperature of the magnet 14, which may, for example, be associated with the lifting of a large object (e.g., $L_L$), the PLC 28 may automatically command the magnet controller 26 at 104 to set a current 106 to a reduced setting to reduce the operating temperature of the magnet 14. If, for example, the current 106 is over- or under-compensated by the PLC 28 according to the input 102*b* provided by the temperature sensor 32*c*, an operator input 108 may be provided at step, S.206*b*, to provide the needed current compensation in order to arrive at the desired behavior of the magnet 14.

One skilled in the art will readily recognize that an "N" dimensional map can be created (using empirical testing) to map multiple inputs against magnet current. For example, magnet temperature, load weight, load classification, can all be used as map inputs to generate a unique magnet current output.

Operation Mode 2—Auto-Drop Mode

Figure 5:
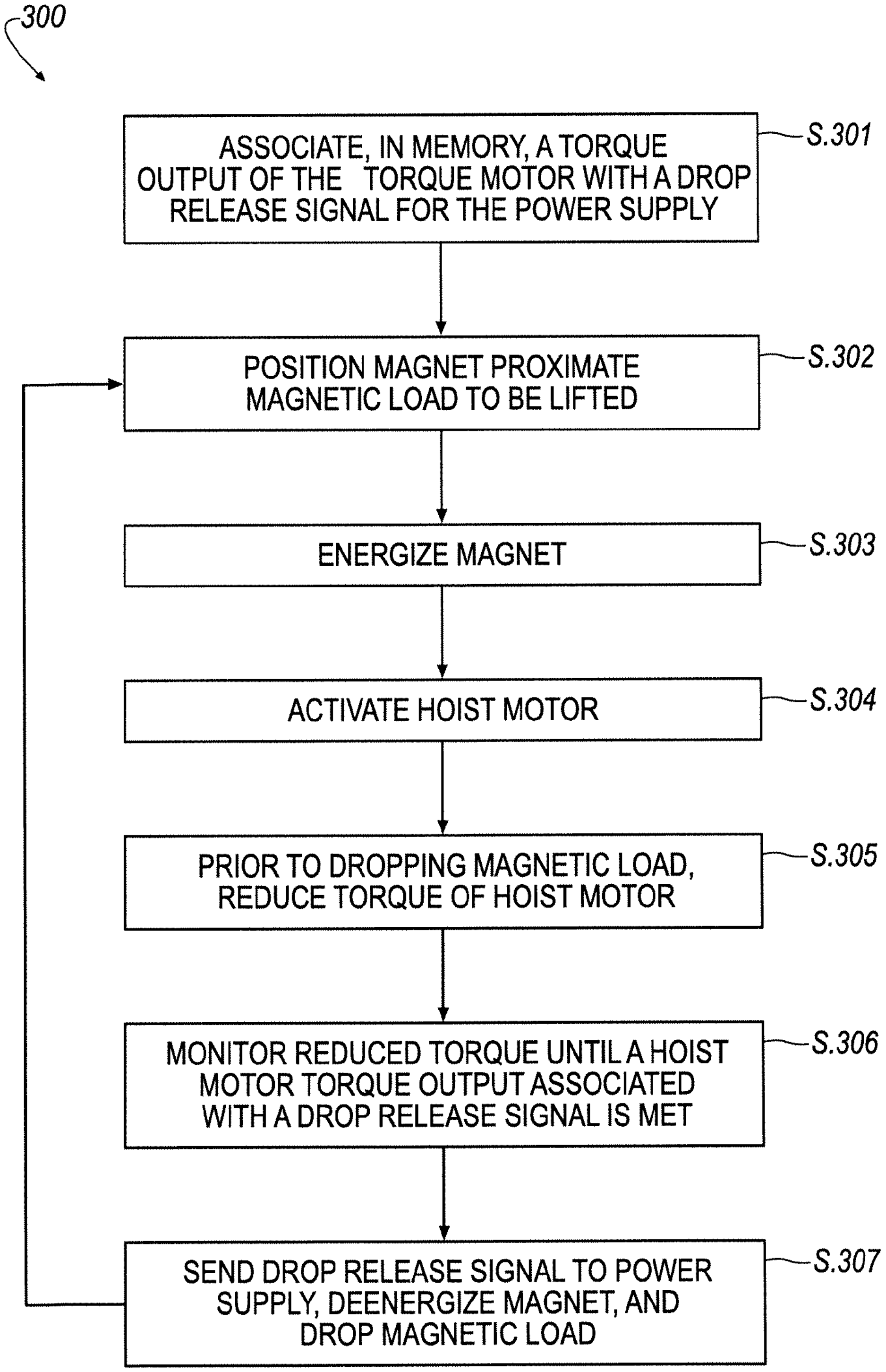
FIG. 5 is a flow chart illustrating a method for providing efficient operation of the electric crane in accordance with an exemplary embodiment of the invention.
Figure 6:
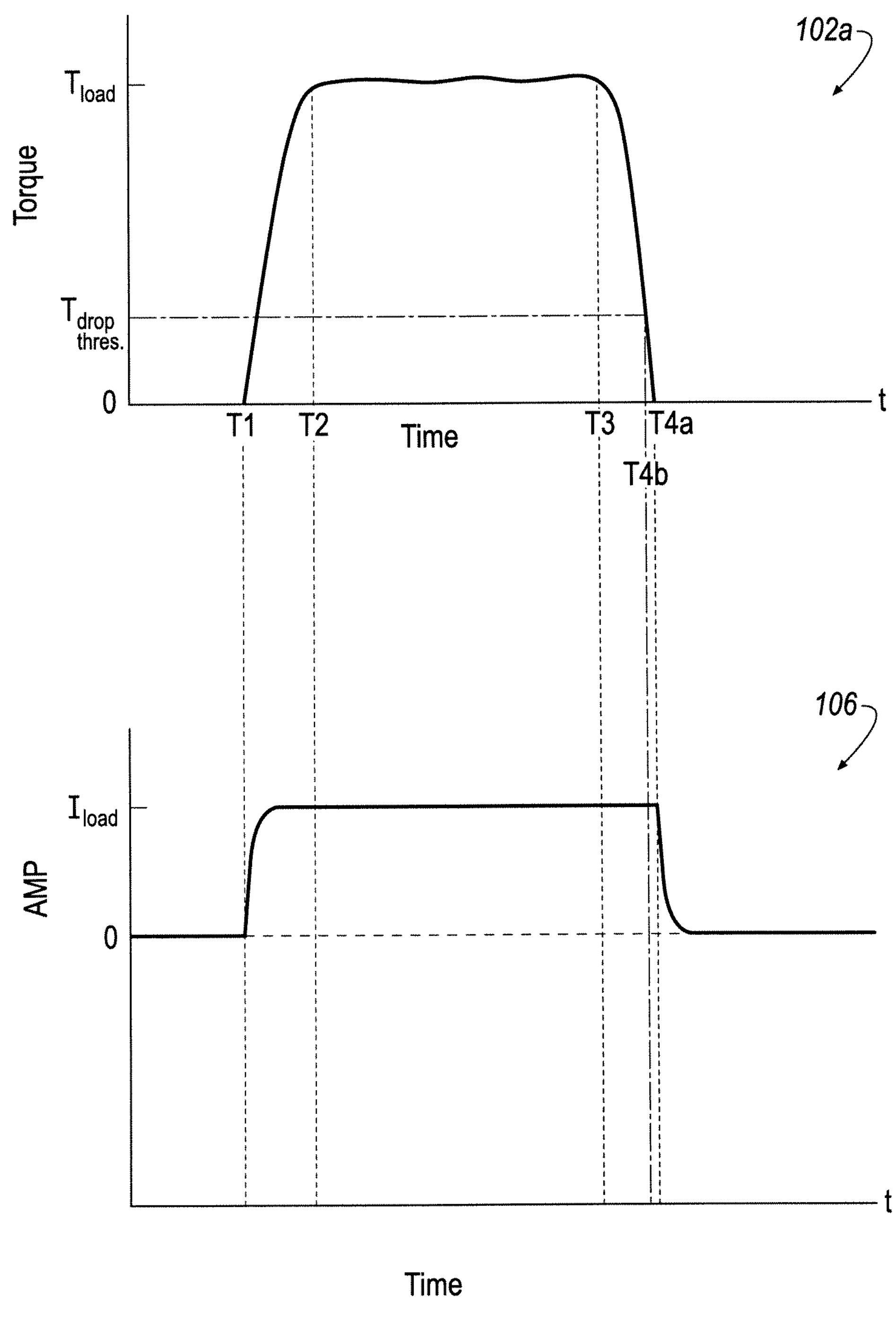
FIG. 6 is a timing diagram associated with the method of FIG. 5 in accordance with an exemplary embodiment of the invention.

As seen in FIGS. 5 and 6, a method 300 including steps S.301-S.307 for providing an improved operation of the crane 12 is shown according to an embodiment. In general, the method 300 operates on the principle of providing feedback 102*a* (FIGS. 1 and 6) to the PLC 28, which may be provided, for example, from the hoist motor 22. In correlation with the feedback 102*a*, less derrick whip and reduced voltage spiking of the hoist motor 22 is enabled by providing a regulated, control input 104 (FIGS. 1A-1D) to the magnet controller 26 that originates from the PLC 28.

Prior to operating the system 10*a*-10*d* according to the method 300, the PLC 28 may be pre-programmed at step S.301 to associate a torque output 102*a* from a hoist motor 22 with a drop release signal 104 to be sent to the magnet controller 26 by way of the PLC 28. In operation, at step S.302, the crane 12 spatially positions the magnet 14 proximate a load $L_S$, $L_M$, $L_L$ that is to be lifted. Then, at step S.303, the magnet 14 is energized and the load $L_S$, $L_M$, $L_L$ is drawn and secured to the magnet. Although not required, step, S.303, may simultaneously occur with an activation of the hoist motor 22 at step, S.304, which is illustrated in FIG. 6.

Referring to FIG. 6, at time, T1 (i.e., steps S.303, S.304), the hoist motor 22 is activated to lift the load $L_S$, $L_M$, $L_L$ above the ground, G, such that the reeling-in of the lift cable 20 sharply increases the torque on the hoist motor 22 until the torque reaches a torque load value, $T_{load}$. The torque load value, $T_{load}$, may be substantially constant from time, T2, to a time, T3, as the crane operator moves the suspended load $L_S$, $L_M$, $L_L$ generally horizontally above the ground, G.

Then, at time, T3, the crane operator may decide to suddenly drop the load $L_S$, $L_M$, $L_L$ to the ground, G. The PLC 28, as such, at step S.305 prevents an abrupt cessation of the current flow in the magnet 14 as would otherwise be associated with a conventional "auto-drop" operation of the crane 12, but rather, at step, S.305, the PLC 28 commands the magnet controller 26 with a command signal 104 that instructs the magnet controller 26 to reduce the torque on the hoist motor 22 to a value less than the torque load value, $T_{load}$, prior to de-energizing the magnet 14.

At step, S.306, the PLC 28 monitors the value of the reduced torque 102*a* after time, T3, until the torque 102*a* on the hoist motor 22 is associated with a hoist motor torque output 102*a* that is correlated with the drop release signal 104 associated in step S.301. Once the torque 102*a* of the torque motor 22 is reduced below a predetermined threshold $T_{dropthres.}$, at step, S.307, the PLC 28 provides the signal 104 to the magnet controller 26 at time, T4*a*, to cease a current flow to the magnet 14, which is seen at 106, thereby dropping the load $L_S$, $L_M$, $L_L$.

Thus, because there is a reduced amount of torque 102*a* (i.e., a torque equal to $T_{drop\text{-}thres.}$) seen by the hoist motor 22, there is a less likelihood for undesirable derrick 18 'whip' or voltage spiking across the hoist motor 22 to occur during the operation of the crane 12. Once the load $L_S$, $L_M$, $L_L$ has been dropped as described above, at step, S.307, the method may be returned to steps S.302 and S.303 where the magnet 14 is positioned and energized so that the hoist motor 22 is activated again at step S.304.

Although three distinct methods 100, 200, 300 have been described as related to the PLC 28, it will be appreciated that one or more of the methods 100, 200, 300 may be conducted sequentially or simultaneously. For example, if, for example, the auto-drop mode 300 is conducted and the magnet 14 is operating relatively hot, the power adjust mode 200 may be activated during the operation of the auto-drop mode 300 to reduce the temperature of the magnet 14. Alternatively, for example, if the auto-drop mode 300 has been completed, the power adjust mode 100 may be conducted subsequently to operate the system 10*a*-10*d* at a reduced power and therefore, at a potentially reduced operating temperature of the magnet 14.

The present invention has been described with reference to certain exemplary embodiments thereof. However, it will be readily apparent to those skilled in the art that it is possible to embody the invention in specific forms other than those of the exemplary embodiments described above. This may be done without departing from the spirit of the invention. The exemplary embodiments are merely illustrative and should not be considered restrictive in any way. The scope of the invention is defined by the appended claims and their equivalents, rather than by the preceding description.

What is claimed is:

1. A system for operating an electric crane, comprising:

a magnet;

a magnet controller in communication with the magnet that controls current flow through the magnet for creating a magnetic field about the magnet; and a closed-loop feedback system that effects automatic control over the magnet controller including:

a feedback device arranged proximate the magnet and away from an operator cabin of the electric crane, wherein the feedback device is communicatively-coupled with the magnet controller, wherein the feedback device creates a feedback input value, a logic controller that receives said feedback input value from the feedback device, wherein, responsive to the feedback input value, the logic controller creates a command value receivable by the magnet controller for causing the magnet controller to automatically modify the current flow through the magnet during operation of the electric crane such that the magnet is automatically operated with a minimum amount of current for automatically creating a magnetic field corresponding to at least one characteristic of material to be lifted by the electric crane for increasing operating efficiency of the magnet while operating the magnet at a lower operating temperature.

2. The system according to claim 1, wherein the logic controller is a programmable logic controller (PLC), wherein the PLC includes a data map including one or more data map feedback input values associated with one or more data map output command values.

3. The system according to claim 1, wherein the feedback device is a load cell connected to the distal end of the cable and arranged proximate the magnet.

4. The system according to claim 3, wherein the feedback input value is a gauge factor provided from said load cell to the magnet controller for causing the magnet controller to modify the current flow through the magnet during operation of the electric crane.

5. A system for operating an electric crane, comprising:

a magnet;

a magnet controller in communication with the magnet;

a hoist motor in communication with the magnet controller, wherein a proximal end of a cable is connected to and reeled by the hoist motor, wherein a distal end of the cable is connected to the magnet, wherein the cable is supported by a pulley and crane derrick, wherein the hoist motor creates a feedback input value; and a logic controller that receives said feedback input value from the hoist motor, wherein, responsive to the feedback input value, the logic controller creates a command value receivable by the magnet controller.

6. The apparatus according to claim 5, wherein the feedback input value is an amperage that is utilized to operate said hoist motor, wherein the command value is a reduction of said current flowing through said magnet.

7. The apparatus according to claim 5, wherein the feedback input value is an torque of the hoist motor, wherein the command value is an auto-drop command to the magnet controller for ceasing flow of said current through said magnet.

8. The apparatus according to claim 7, wherein the torque is approximately equal to an auto-drop threshold torque value.

9. The system according to claim 1, wherein the feedback device is an imaging camera arranged proximate the magnet for imaging the material to be lifted by the electric crane.

10. The system according to claim 9, wherein the feedback input value is a captured image of the material to be lifted by the electric crane that is provided from said imaging camera to the magnet controller for causing the magnet controller to modify the current flow through the magnet during operation of the electric crane.

11. The system according to claim 1, wherein the feedback device is a temperature sensor directly connected to the magnet for obtaining an operating temperature of the magnet.

12. The system according to claim 11, wherein the feedback input value is a determined operating temperature of the magnet that is provided from said temperature sensor to the magnet controller for causing the magnet controller to modify the current flow through the magnet during operation of the electric crane.

* * * * *